(12) United States Patent
Balazovic et al.

(10) Patent No.: US 8,674,638 B2
(45) Date of Patent: Mar. 18, 2014

(54) DETERMINING INITIAL ROTOR POSITION OF AN ALTERNATING CURRENT MOTOR

(75) Inventors: Peter Balazovic, Roznov Pod Radhostem (CZ); Roman Filka, Roznov Pod Radhostem (CZ)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/139,893

(22) PCT Filed: Jan. 5, 2009

(86) PCT No.: PCT/IB2009/050013
§ 371 (c)(1),
(2), (4) Date: Jun. 15, 2011

(87) PCT Pub. No.: WO2010/076669
PCT Pub. Date: Jul. 8, 2010

(65) Prior Publication Data
US 2011/0248659 A1 Oct. 13, 2011

(51) Int. Cl.
H02P 1/04 (2006.01)
(52) U.S. Cl.
USPC .................................................. 318/400.33
(58) Field of Classification Search
USPC ........................................... 318/400.03, 806
See application file for complete search history.

(56) References Cited

U.S. PATENT DOCUMENTS 6,163,128 A 12/2000 Hiti et al.
6,762,573 B2 7/2004 Patel
(Continued)

FOREIGN PATENT DOCUMENTS

WO 2009/024835 A1 2/2009
WO 2009/138821 A2 11/2009

OTHER PUBLICATIONS

Jung-Ik Ha et al: "Sensorless Position Control and Initial Position Estimation of an Interior Permanent Magnet Motor" Conference Record of the 2001 IEEE Industry Applications Conference, 36th IAS Annual Meeting, Chicago, IL, Sep. 30-Oct. 4, 2001; [Conference Record of the IEEE Industry Applications Conference, IAS Annual Meeting] New York, NY: IEEE, US, vol. 4 Sep. 30, 2001, pp. 2607-2613.

(Continued)

Primary Examiner — Lincoln Donovan
Assistant Examiner — Zoheb Imtiaz (57) ABSTRACT

Determination of an estimated initial angular position of the rotor of an AC motor includes application of voltages corresponding to a high frequency reference signal vector to the stator windings of the motor and production of an estimated initial angular position of the rotor as a function of the resulting q-axis stator current component iq_HF, adjustment of transformation of signal vectors from stationary to rotating coordinates and vice versa using the estimated angular position and production of an adjusted estimated angular position of the rotor as a function of the q-axis stator current component as adjusted. Determination of an initial estimated angular position of the rotor and production of an adjusted initial estimated angular position of the rotor is performed with the rotor at standstill and before initially applying voltage corresponding to the drive signal vector to the stator windings, and production of an initial value of a drive signal vector command in stationary coordinates uses the adjusted estimated angular position. Determination of an estimated angular position of the rotor after application of stator current may use a different method, such as a physical relative position sensor.

20 Claims, 4 Drawing Sheets

(56) References Cited

U.S. PATENT DOCUMENTS

| | | |
|---|---|---|
| 6,894,454 B2 | 5/2005 | Patel et al. |
| 7,211,984 B2 | 5/2007 | Patel et al. |
| 2003/0006723 A1 | 1/2003 | Sul et al. |
| 2006/0061319 A1 | 3/2006 | Markunas et al. |
| 2007/0132424 A1* | 6/2007 | Takao et al. .................. 318/806 |

OTHER PUBLICATIONS

Jung-Ik Ha et al: "Sensorless Rotor Position Estimation of an Interior Permanent-Magnet Motor from Initial States" IEEE Transactions on Industry Applications, IEEE Service Center, Piscataway, NJ, US, vol. 39, No. 3, May 1, 2003, pp. 761-767.

Jiangang Hu et al: "Eddy Current Effects on Rotor Position Estimation and Magnetic Pole Identification of PMSM at Zero and Low Speeds" IEEE Transactions on Power Electronics, IEEE Service Center, Piscataway, NJ, US, vol. 23, No. 5, Sep. 1, 2008, pp. 2565-2575.

Bianchi N et al: "Advantages of Inset PM Machines for Zero-Speed Sensorless Position Detection" IEEE Transactions on Industry Applications, IEEE Service Center, Piscataway, NJ, US, vol. 44, No. 4, Jul. 1, 2008, pp. 1190-1198.

Mizutani Ryoji et al: "Current Model-Based Sensorless Drives of Salient-Pole PMSM at Low Speed and Standstill" IEEE Transactions on Industry Applications, vol. 34, No. 4, Jul./Aug. 1998, pp. 841-846.

Jeong Y. et al: "Initial Rotor Position Estimation of an Interior Permanent Magnet Synchronous Machine Using Carrier-Frequency Injection Methods" Electric Machines and Drives Conference, 2003. IEMDC'03. IEEE International, vol. 2, Jun. 1-4, 2008, pp. 1218-1223.

International Search Report and Written Opinion correlating to PCT/IB2009/050013 dated Nov. 20, 2009.

* cited by examiner

DETERMINING INITIAL ROTOR POSITION OF AN ALTERNATING CURRENT MOTOR

FIELD OF THE INVENTION

This invention relates to determining the initial rotor position of an alternating current motor.

BACKGROUND OF THE INVENTION

Alternating current ('AC') motor systems typically comprise a motor comprising a rotor and a stator and a motor controller for controlling the voltage and current supplied to drive the motor. In order to ensure good control of the motor, for example in order to meet specified motor performance requirements, the motor controller needs to know the position of the motor rotor.

Various techniques are known for estimating the rotor position. Physical position sensors, such as position and velocity transducers, can be used although such position sensors and their associated cabling and connectors increase the size, weight and complexity of the AC motor system and have also been a source of failure for AC motor systems. In order to eliminate such position sensors, particularly for small low cost motor controllers, much research has taken place into sensorless techniques for determining rotor position for different classes of motors under a variety of different operating conditions.

A simple technique uses the induced back electromotive force ('EMF') generated in the motor. However, at rotor standstill or low speed there is insufficient back electromotive force (EMF) generated in the motor to enable an accurate estimate of rotor position.

More complex techniques are based upon injection of appropriate high frequency ('HF') reference signals superimposed on the drive torque and flux control signals and the tracking of the response of the stator currents of the AC motor to the injected reference signal in order to determine the rotor position. The frequency of the injected signal is sufficiently higher than the fundamental frequency of the drive currents to be distinguishable from them and is limited by the impedance and reaction time characteristics of the controller. The basis for most low and zero speed sensorless control techniques is the magnitude of a q-axis stator current at the injected signal frequency calculated in rotating direct ('d-axis') and quadrature ('q-axis') coordinates defined by a d-q reference frame rotating with the rotor, with the d-axis coinciding with the rotor magnetic axis, while the q-axis is perpendicular to the d-axis. This q-axis stator current is generated by the effect of the rotor position on the stator inductance and is referred to as saliency. In a Permanent Magnet (PM) motor, for example, there are several sources of saliencies, such as rotor inherent saliency, saturation based saliency (stator, teeth).

US patent application publication no. 2006/0061319, U.S. Pat. No. 6,894,454, the article "Current Model-Based Sensorless Drives of Salient-Pole PMSM at Low Speed and Standstill" by Ryoji Mizutani et al, in IEEE Transactions on Industry Applications, Vol. 34, NO. 4, July/August 1998 and the article "Initial Rotor Position Estimation of an Interior Permanent-Magnet Synchronous Machine Using Carrier-Frequency Injection Methods" by Yu-seok Jeong et al, in IEEE TRANSACTIONS ON INDUSTRY APPLICATIONS, VOL. 41, NO. 1, JANUARY/FEBRUARY 2005 disclose methods of determining rotor position in which an HF carrier or pulse signal is injected into the stator windings by combining the HF signal with the command voltage signals that control the current provided to the stator of the AC motor to generate magnetic flux component (d-axis) and a torque component (q-axis). The resulting HF components, which carry the saliency position information and which are part of the feedback current from the stator, are then separated from the drive components of the stator current and processed by a processor in the motor controller to determine the rotor position. The feedback current is also fed back as part of a control loop in the controller to control the power applied to the stator.

These known techniques where the command voltage signals are applied to generate the stator drive current simultaneously with the injected HF carrier signal, torque is applied to the rotor before its initial standstill position is known and the rotor moves, delaying and disturbing determination of its estimated position. The initial start-up torque applied to the rotor is reduced by misalignment between the estimated and real initial rotor positions. It is possible to perform a physical alignment sequence, in which the rotor initially moves to a position corresponding to a known position, which is then defined as aligned, but this also involves a delay in applying full initial start-up torque to the rotor.

Furthermore, the Applicant's co-pending international patent application PCT/IB2007/053318 filed 20 Aug. 2007 discloses another sensorless rotor position determining method which avoids interference between the injected carrier signal and HF harmonic components of the command voltage signals generated in the motor due to the operation of the control loop, for example during changes in motor load.

SUMMARY OF THE INVENTION

The present invention provides a method of controlling an alternating current motor, a computer programme for performing such a method, a controller for controlling an alternating current motor and motor apparatus including such a controller, as described in the accompanying claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

The present disclosure will be described with reference to a 3-phase Permanent Magnet Synchronous motor. It will be appreciated that the disclosure is not limited to use with a 3-phase Permanent Magnet Synchronous motor and may apply to any AC motor with saliency, for example 2-phase AC motors, wound-rotor AC motors, a permanent magnet motor with the permanent magnet buried in the motor or surface mounted, a Synchronous Reluctance Motor (SynRM), a Switched Reluctance Motor (SRM), or an AC Induction Motor (ACIM).

Figure 1:
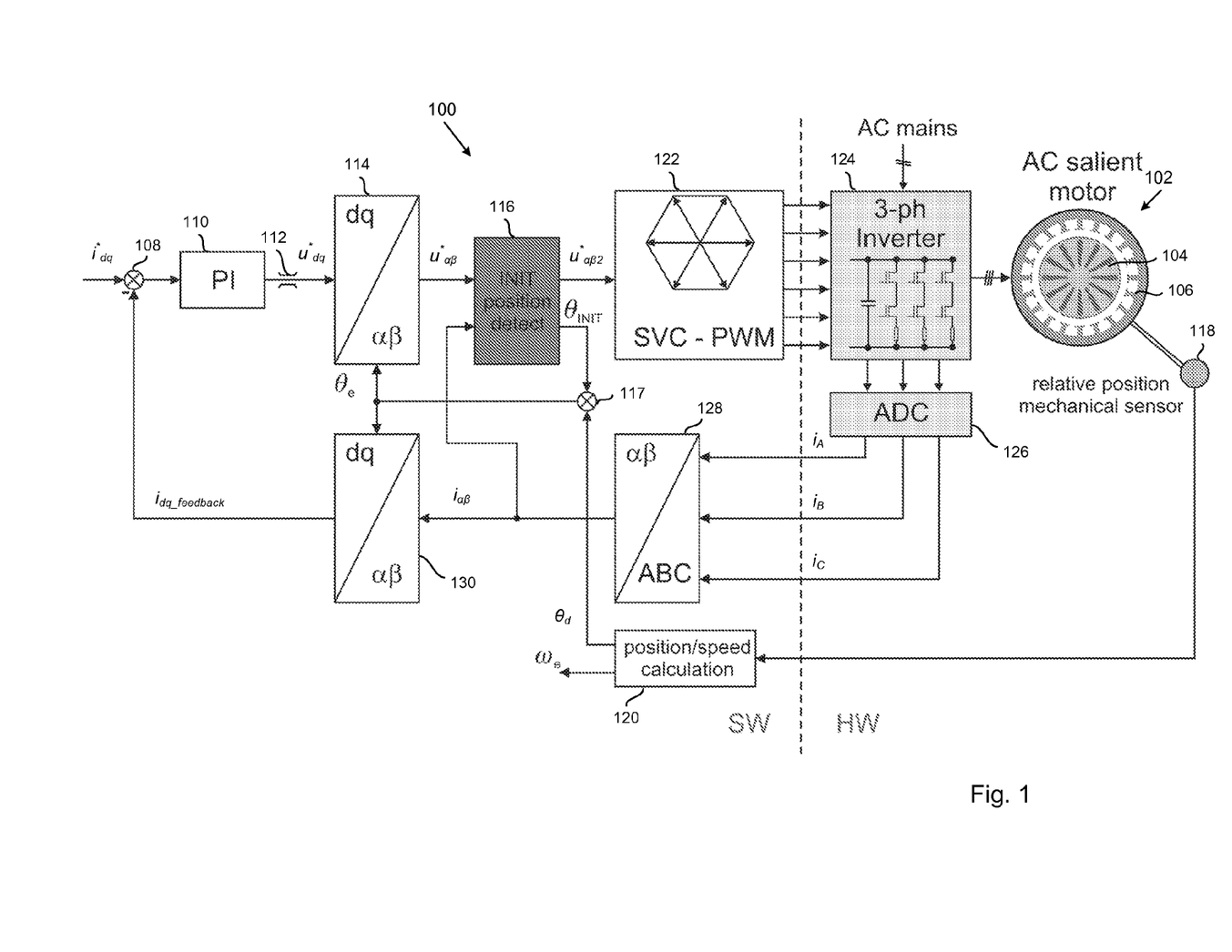
FIG. 1 is a schematic block diagram of apparatus for controlling an alternating current motor in accordance with one embodiment of the invention, given by way of example.

FIG. 1 shows a controller 100 in accordance with an embodiment of the present invention for an alternating current ('AC') salient electric motor 102 which has a rotor 104 and a stator 106. The controller of FIG. 1 calculates values in direct ('D-axis') and quadrature ('Q-axis') coordinates which rotate relative to the stator before transforming the values to α, β angular coordinates that are static relative to the stator and which in turn are then transformed to static three phase A, B, C components, which are applied to three-phase windings of the stator 106 in the case illustrated of a three-phase motor. It will be appreciated that the invention is applicable to motors with numbers of phases other than three, in which case the numbers of phase components will be adapted correspondingly.

The controller shown in FIG. 1 receives a current command signal vector $i^*_{dq}$ calculated as a function of a required torque directly or indirectly depending on a desired speed or position of the rotor of the motor 102, for example. The current command signal vector $i_{dg}$ represents corresponding required flux and torque current components in the d-axis and q-axis. The controller generates a voltage command signal vector $u^*_{dq}$, representing the required operating point for the d-axis and q-axis motor field and torque voltage components needed to obtain the required current components. Various methods are available for generating the current command signal vector $i^*_{dq}$ and voltage command signal vector $u^*_{dq}$, such as the methods described in the Applicant's co-pending international patent application PCT/IB2008/051933, filed 16 May 2008, for example. This enables field-weakening to be applied to the command signal vectors. In the example shown in FIG. 1, the voltage command signal vector $u/^*_{dq}$ is generated by a comparator which receives the current command input signal vector $i_{dg}$ and a current feedback signal vector $i_{dq\_feedback}$, representing the actual values of the stator drive current components, the difference being fed as input to a control element 110 which may perform proportional-integral operations, possibly together with feed-forward operations, on the difference between the input and feedback signal vectors so as to generate the voltage command signal vector $u^*_{dq}$, the extreme values of the voltage command signal vector $u^*_{dq}$ being limited in a limiter 112, for example.

The voltage command signal vector $u^*_{dq}$ is then subjected to an inverse Park transformation in a module 114, which transforms the required voltage vector components in rotating d-q coordinates to a voltage command vector $u^*_{\alpha\beta}$ in stationary two-phase αβ angular coordinates (DQ to αβ transformation), using an estimated angular position $\theta_e$ of the rotor 104 so that, if the angular position estimate is accurate, the reference frame of the angular coordinates rotates synchronously with the rotor. A selection unit 116 produces a derived voltage command signal vector $u^*_{\alpha\beta2}$ based on a value $\theta_d$ for the angular position $\theta_e$ used by the Park transformation element 114 during a drive phase of operation, once drive current has been applied to the stator windings 106. However, during an initial phase of operation before the drive phase of operation, the selection unit 116 performs an initial calculation to establish an initial value $\theta_{INIT}$ for the angular position $\theta_e$ used by the Park transformation element 114. A combination element 117 receives the value $\theta_d$ during the drive phase and the initial value $\theta_{INIT}$ during the initial phase and provides the asserted value as output $\theta_e$. In this example of the implementation of the invention, the value $\theta_d$ used for the angular position $\theta_e$ after drive current has been applied to the stator windings 106 is produced by a physical relative position sensor 118, such as an incremental encoder or a tacho-generator, with a position and speed calculator 120, for example, which would require at least one full mechanical rotation of the rotor (mechanical alignment) to register correctly the rotor position aligned with the magnetic flux of the rotor, which this embodiment of the present invention makes it possible to avoid. In the case where a sensorless algorithm is used to determine the rotor position during motor drive, the algorithm may start with an initial position determination provided by this embodiment of the present invention. The selected voltage command signal vector $u^*_{\alpha\beta2}$ is then applied to a Space Vector Modulation element 122, which calculates duty-cycles for three phase A, B, C voltage components, which are applied to the three-phase windings of the stator 106 by pulse-width modulation of three switching legs of an inverter 124 supplied with power from the mains power supply. Suitable techniques for Park (DQ to αβ) transformation inverse transformation and for Space Vector Modulation are known and are referred to for example in U.S. Pat. No. 6,163,128.

A feedback path includes an analogue-to-digital converter ('ADC') 126 which converts the three phase stator current components $i_A$, $i_B$, $i_C$ to digital values. A three-to-two phase current reconstruction element 128 calculates the equivalent signal vector $i_{\alpha\beta}$ in αβ stationary angular coordinates, which is supplied as input to the selection unit 116. A Park transformation module 130 transforms the αβ stationary angular coordinates to rotating d-q coordinates to produce the feedback current signal vector $i_{dq\_feedback}$, which is supplied as input to the comparator 108. The Park transformation module 130 is supplied with the same estimated angular position $\theta_e$ of the rotor 104 as the inverse Park transformation module 114. The comparator 108, the control element 110, the transformation module 114 and the selection unit 116 constitute a module for determination of an estimated angular position $\theta_e$ of said rotor and for production of drive torque and flux signals $u^*_{\alpha\beta}$ in stationary coordinates as functions of command signals $i^*_{dq}$ in rotating coordinates using the estimated angular position $\theta_e$.

Various techniques may be used for the current reconstruction element 128 such as those given in Application Note AN 1930 (section 7.6.1) and in Application Note AN1931 (section 4.3.2) produced by Freescale Semiconductor, Inc. However, it will be appreciated that the current reconstruction element 128 may be constructed differently and, for example, $i_{\alpha\beta}$ can be reconstructed by single shunt measurement of DC bus current.

Figure 2:
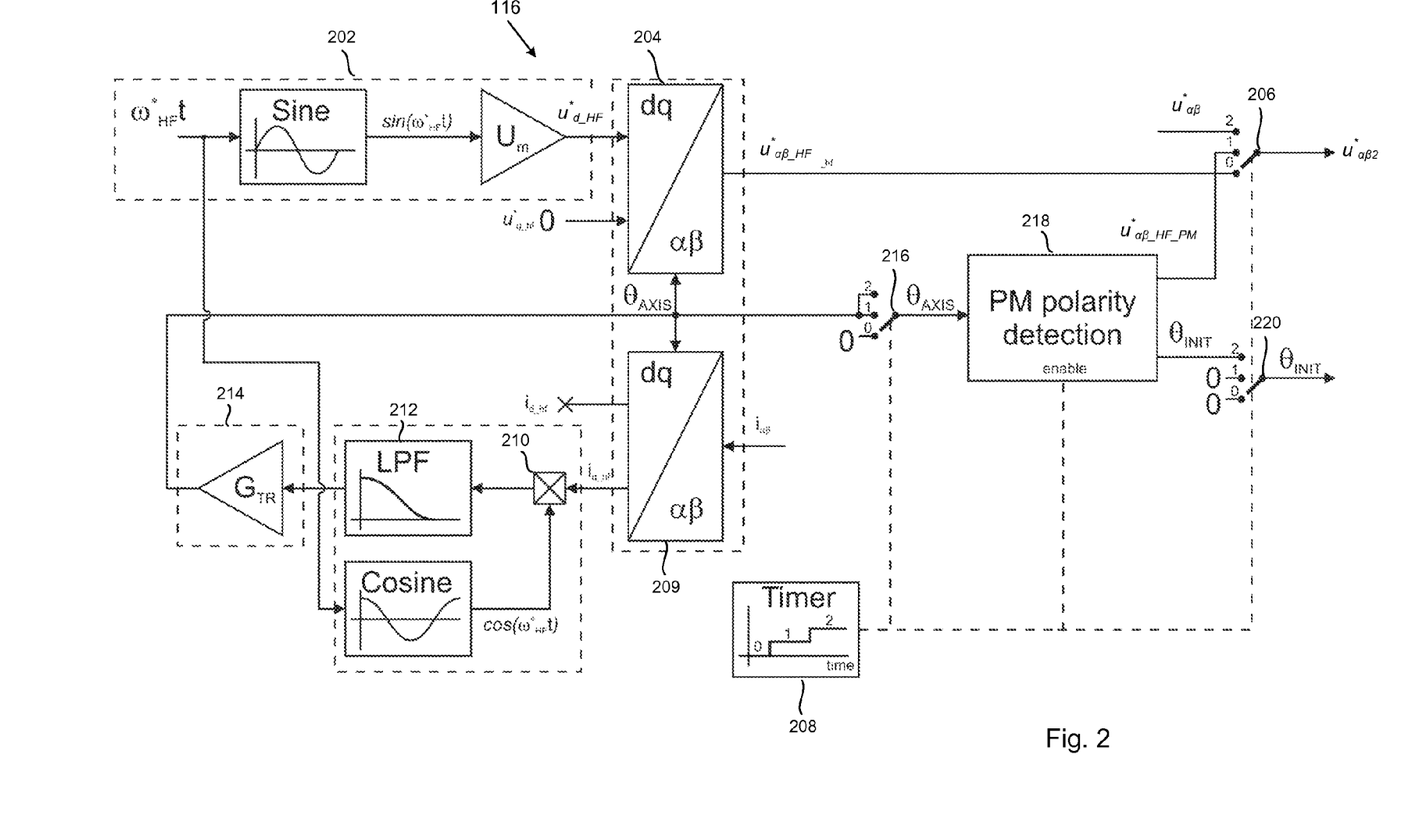
FIG. 2 is a schematic block diagram of a module for determining the initial rotor position of an alternating current motor in the apparatus of FIG. 1.

In the example of an embodiment of the invention illustrated by FIG. 2 in conjunction with FIG. 1, the motor is controlled by a method comprising determination of an estimated initial angular position $\theta_{AXIS}$, $\theta_{INIT}$ of the rotor, and production of a drive signal vector $u^*_{\alpha\beta}$ in stationary coordinates as a function of flux and torque components of a command signal vector $i^*_{dq}$ in rotating coordinates using the estimated initial angular position $\theta_{AXIS}$, $\theta_{INIT}$. The determination of an estimated initial angular position of the rotor includes production of a high frequency reference signal vector as a d-axis component $u^*_{d\_HF}$ in rotating coordinates, transformation of the d-axis component to produce a corresponding high frequency reference signal vector $u^*_{\alpha\beta\_HF}$ in stationary coordinates, application of voltages corresponding to the high frequency reference signal vector $u^*_{\alpha\beta\_HF}$ in stationary coordinates to the stator windings 106 of the motor, transformation of corresponding high frequency stator current signal vectors $i_A$, $i_B$, $i_C$, $i_{\alpha\beta}$ in stationary coordinates to produce a corresponding q-axis stator current component $i_{q\_HF}$ in rotating coordinates, production of an estimated initial angular position $\theta_{AXIS}$, $\theta_{INIT}$ of the rotor as a function of the q-axis stator current component $i_{q\_HF}$, adjustment of the rotating coordinates using the estimated initial angular position $\theta_{AXIS}$, $\theta_{INIT}$ and consequent adjustment of the voltages corresponding to the high frequency reference signal vector $u^*_{\alpha\beta\_HF}$ in stationary coordinates and of the q-axis stator current component $i_{q\_HF}$, and production of an adjusted estimated initial angular position $\theta_{AXIS}$, $\theta_{INIT}$ of the rotor as a function of the q-axis stator current component $i_{q\_HF}$ as adjusted. The determination of an estimated initial angular position $\theta_{AXIS}$, $\theta_{INIT}$ of the rotor and production of an adjusted estimated initial angular position $\theta_{AXIS}$, $\theta_{INIT}$ of the rotor is performed with the rotor 104 at standstill and before initially applying voltage corresponding to the drive signal vector $u^*_{\alpha\beta}$ to the stator windings 106. The production of an initial value of the drive signal vector $u^*_{\alpha\beta}$ in stationary coordinates uses the adjusted estimated initial angular position.

In more detail, FIG. 2 shows an example of the selection unit 116 in the controller 100. The selection unit 116 comprises an input element 202, which receives a high frequency ('HF') reference signal $\omega^*_{HF}t$ at a frequency $\omega_{HF}$ sufficiently high for the reactive part of the impedance of the stator windings seen by the HF reference signal to be substantially higher than the resistive part of the impedance, the reactive part being essentially inductive. In one example of an implementation of the invention, the frequency $\omega_{HF}$ is in the range of 500 Hz to 2000 Hz. The input element 202 generates an in-phase component $u^*_{d\_HF}$, the quadrature component being substantially 0, which is applied to an inverse Park transformation module 204, similar to the inverse Park transformation module 114. The inverse Park transformation module 204 produces a signal vector $u^*_{\alpha\beta\_HF}$, which is applied to a first input of a three input selector 206 controlled by a timer 208. The inverse Park transformation module 204 uses an initial estimated angular position $\theta_{AXIS}$ of the rotor 104. The output of the selector 206 is the signal vector $u^*_{\alpha\beta2}$, which is applied to the Space Vector Modulation element 122, which calculates duty-cycles for three phase A, B, C voltage components that are applied by the inverter 124 to the three-phase windings of the stator 106, producing corresponding currents in the stator windings 106.

A Park transformation module 209, similar to the Park transformation module 130, receives the signal vector $i_{\alpha\beta}$ from the current reconstruction element 128 and transforms the $\alpha\beta$ stationary angular coordinates of the signal vector $i_{\alpha\beta}$ to rotating d-q coordinates using the initial estimated angular position $\theta_{AXIS}$ of the rotor 104. The quadrature component $i_{q\_HF}$ is selected by homodyning the output of the element 209 with a quadrature component $\cos(\omega^*_{HF}t)$ of the HF reference signal $\omega^*_{HF}$ in a mixer 210 and selecting the DC component in a low-pass filter 212. The output of the filter 212 is amplified in a buffer amplifier 214 and the output of the buffer amplifier 214 is the value $\theta_{AXIS}$ representing an initial position estimate of the rotor 104, which is applied to the inverse Park transformation module 204 and the Park transformation module 209. A three input selector 216 controlled by the timer 208 has a first input that receives a default zero value and second and third inputs which receive the signal $\theta_{AXIS}$. The output of the selector 216 is applied to an input of a polarity detection unit 218 which detects the polarity of the permanent magnet. The polarity detection unit 218 also receives the signal vector $u^*_{\alpha\beta\_HF}$ and provides a corresponding output signal vector $u^*_{\alpha\beta\_HF\_PM}$ for which the North-South ambiguity in the rotor position is resolved, the output signal vector $u^*_{\alpha\beta\_HF\_PM}$ being applied to a second input of the selector 206. An example of a suitable polarity detector that can be used in this embodiment of the present invention is given in US Patent specification 2004/0070362. The third input of the selector 206 receives the voltage command signal vector $u^*_{\alpha\beta}$ from the inverse Park transformation module 114.

A three input selector 220 controlled by the timer 208 has first and second inputs that receive a default zero value. The polarity detection unit 218 also provides the output $\theta_{INIT}$ corresponding to its input $\theta_{AXIS}$ but for which the North-South ambiguity in the rotor position is resolved and which is applied to a third input of the selector 220.

In operation, during the initial phase of operation before drive current is applied to the stator windings 106, in the absence of excitation of the windings and while the rotor is at standstill, the timer 208 initially sets the selectors 206, 216 and 220 to conditions in which they pass the values at their first inputs to their outputs. When the HF reference signal $\omega_{HF}t$ is applied to the input element 202, the initial estimated angular position value $\theta_{AXIS}$ used by the inverse Park transformation module 204 to produce the signal vector $u^*_{\alpha\beta\_HF}$ is equal to the default zero value. The signal vector $u^*_{\alpha\beta2}$, which is applied to the Space Vector Modulation element 122 corresponds to an initial assumption that the rotor angular position is zero. The corresponding stator current signal vector $i_{\alpha\beta}$ is transformed to rotating d-q coordinates by the Park transformation module 209, using the same zero default value of $\theta_{AXIS}$, and the quadrature component $i_{q\_HF}$ is to a first order proportional to a first estimate of the rotor position. The following equation applies:

$$i_{dq} = \begin{bmatrix} i_{d\_HF} \\ i_{q\_HF} \end{bmatrix} =$$

$$\frac{1}{\omega_{HF}L_dL_q} \begin{bmatrix} \frac{L_d+L_q}{2} - \frac{L_d-L_q}{2}\cos(2\theta_{err}) & \frac{L_d-L_q}{2}\sin(2\theta_{err}) \\ \frac{L_d-L_q}{2}\sin(2\theta_{err}) & \frac{L_d+L_q}{2} + \frac{L_d-L_q}{2}\cos(2\theta_{err}) \end{bmatrix} \begin{bmatrix} U_m\sin(\omega_{HF}\cdot t) \\ 0 \end{bmatrix}$$

where
$L_d$=direct axis inductance
$L_q$=quadrature axis inductance
$U_m$=HF voltage amplitude
$\omega_{HF}$=HF frequency, and
$\theta_{err}$=difference between the estimated value of $\theta_{AXIS}$ and the actual rotor position.

The value $\theta_{AXIS}$ after homodyning is then applied to the inverse Park transformation module 204 in a second iteration and the Park transformation module 209 and the more accurate transformations in the inverse Park transformation module 204 and the Park transformation module 209 produce a second, more accurate calculation of the value $\theta_{AXIS}$.

Figure 3:
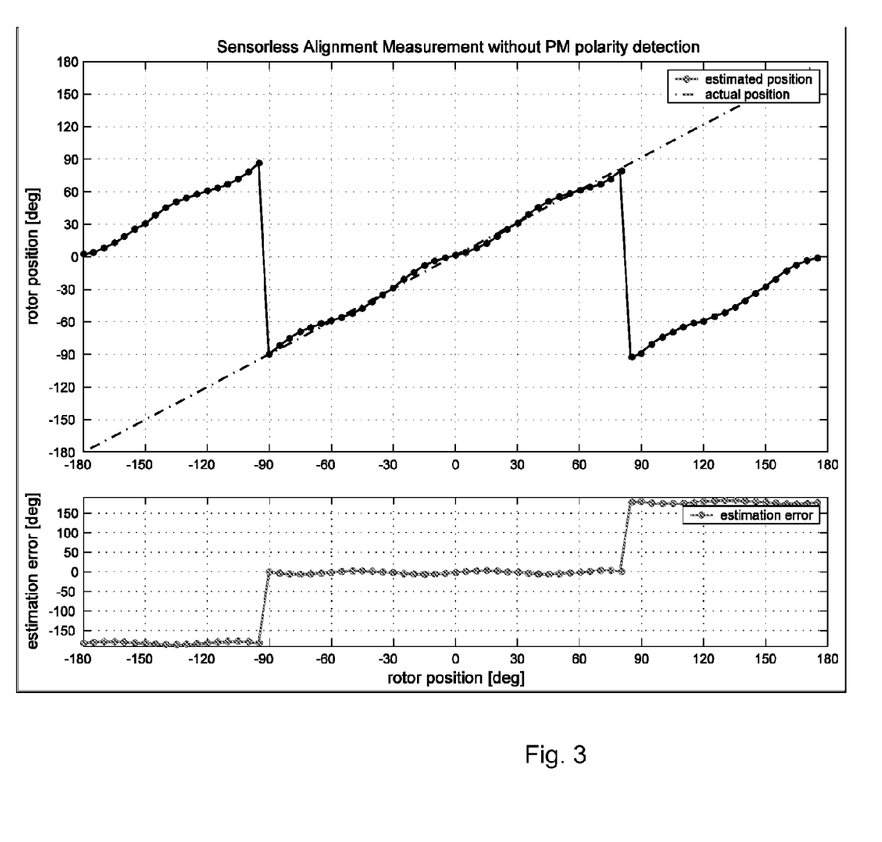
FIG. 3 is a graph showing an estimation of the initial rotor position by the module of FIG. 2 as a function of the actual position of the rotor.

The above iterations correspond to a minimisation of the quadrature feedback component $i_{q\_HF}$, with $\theta_{err}$ tending towards zero, by adjustment of the estimated angular position value $\theta_{AXIS}$ which the inverse Park transformation module 204 uses to produce the signal vector $u^*_{\alpha\beta\_HF}$. FIG. 3 shows graphs of the value $\theta_{AXIS}$ and of the error in the value $\theta_{AXIS}$ as a function of actual position. It will be seen that a good approximation is obtained except for an ambiguity as to the polarity of the rotor position.

In a second stage, still during the initial phase of operation before drive current is applied to the stator windings 106, in the absence of excitation of the windings and while the rotor is at standstill, the timer 208 sets the selectors 206, 216 and 220 to conditions in which they pass the values at their second inputs to their outputs and the timer 208 enables operation of the polarity detection unit 218. The selector 216 passes the value $\theta_{AXIS}$ to the polarity detection unit 218, representing the second iteration estimate of the rotor position, and the polarity detection unit 218 corrects the polarity ambiguity and the selector 206 substitutes a corrected value of $u^*_{\alpha\beta\_HF}$ for the previous estimate.

The timer 208 times an interval of time sufficient for the feedback loop involving the corresponding stator current signal vector $i_{\alpha\beta}$ and calculation of the value $\theta_{AXIS}$ to stabilise, establishing the initial rotor position with polarity correction, and after this interval the timer 208 establishes the drive phase of the motor and sets the selectors 206, 216 and 220 to conditions in which they pass the values at their third inputs to their outputs. The selector 206 passes the command signal vector $u^*_{\alpha\beta}$ as the output $u^*_{\alpha\beta2}$ of the selection unit 116. The polarity detection unit 218 passes the value $\theta_{AXIS}$ from the selector 216 as the output $\theta_{INIT}$. After the application of drive current to the stator and/or movement of the rotor the value $\theta_{INIT}$ is used as an offset to the value $\theta_d$ from the position and speed calculator 120 and the mechanical relative position sensor 118, whereas in the case where a sensorless algorithm is used to estimate the rotor position, $\theta_{INIT}$ is used as a starting point for the value $\theta_d$ calculated by the algorithm.

Figure 4:
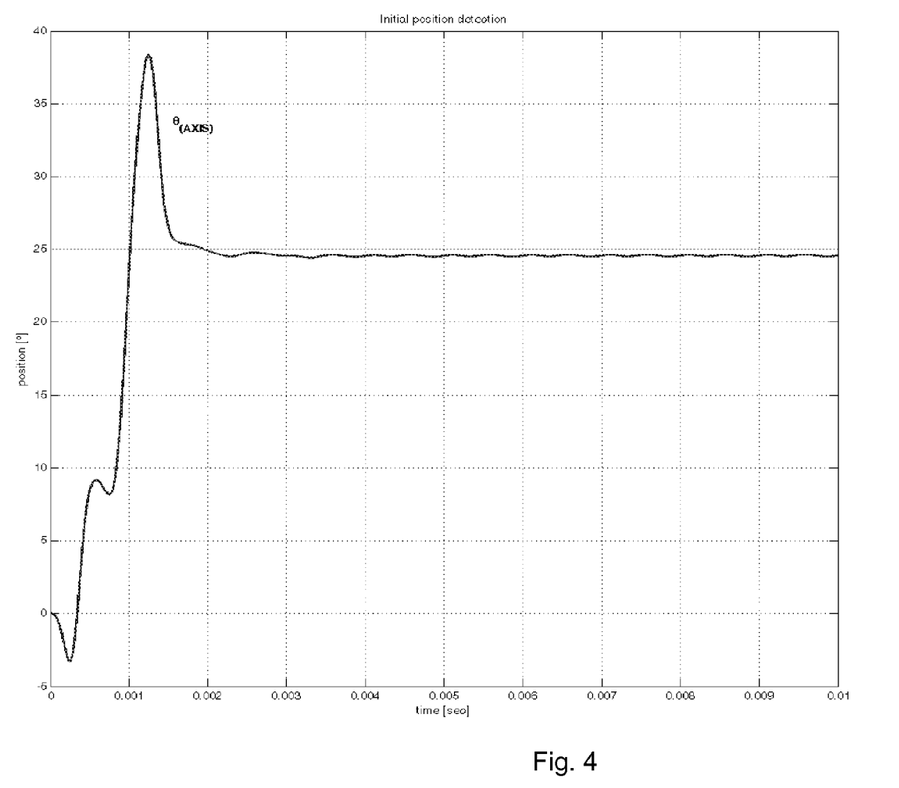
FIG. 4 is a graph showing the variation of an estimation of the initial rotor position by the module of FIG. 2 as a function of time.

The initial phase of estimation of rotor position, before drive current is applied to the stator windings 106, in the absence of excitation of the windings and while the rotor is at standstill, is performed without interference from any drive currents, giving an accurate estimate of initial rotor position without the need for resource-intensive filters. The initial phase of estimation of rotor position is rapid, as illustrated by FIG. 4, which shows a graph of the estimated value $\theta_{AXIS}$ of rotor position as a function of time for an actual rotor angular position of 25°. It will be seen therein that 1.5 msec can be sufficient to stabilise the initial estimate of rotor position. The motor can then start immediately with stator field and torque drive current components at the correct phase angles for full torque as defined by the current command signal vector $i^*_{dq}$ to be applied to the rotor 104. During the initial phase, since the q-axis component $u^*_{q\_HF}$ of the HF reference signal is zero, any unwanted torque generated during the initial rotor position calculation phase is insignificant.

The controller 100 of embodiments of the invention, including the elements providing the outputs of the Space Vector Modulation element 122 and the elements exploiting the inputs from the ADC 126 and the position sensor 118, for example, may be implemented by hardware but also may be implemented partially or wholly in a computer program. Accordingly, the representation of, and reference to, elements or units or modules will be understood to cover software elements or alternatively physical hardware elements, where the context admits. The computer program may include code portions for performing steps of the method when run on a programmable apparatus, such as a computer system, or enabling a programmable apparatus to perform functions of a device or system according to embodiments of the invention. The computer program may for instance include one or more of: a subroutine, a function, a procedure, an object method, an object implementation, an executable application, an applet, a serviette, a source code, an object code, a shared library/ dynamic load library and/or other sequence of instructions designed for execution on a computer system. The computer program may be provided on a data carrier, such as a CD-ROM or other storage device, containing data loadable in a memory of a computer system, the data representing the computer program or may be provided over a data connection, such as a telephone cable or a wireless connection. The description of the process architecture has been simplified for purposes of illustration, and it is just one of many different types of appropriate architectures that may be used in embodiments of the invention. It will be appreciated that the boundaries between logic blocks are merely illustrative and that alternative embodiments may merge logic blocks or circuit elements or impose an alternate decomposition of functionality upon various logic blocks or circuit elements.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection or link suitable to transfer signals or values from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer signals or power. The terms "assert" or "set" and "negate" (or "dissert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Where the apparatus implementing the present invention is composed of electronic components and circuits known to those skilled in the art, circuit details have not been explained to any greater extent than that considered necessary for the understanding and appreciation of the underlying concepts of the present invention.

Where the context admits, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Where the context admits, illustrated hardware elements may be circuitry located on a single integrated circuit or within a same device or may include a plurality of separate integrated circuits or separate devices interconnected with each other. Also, hardware elements in an embodiment of the invention may be replaced by software or code representations in an embodiment of the invention.

Furthermore, it will be appreciated that boundaries described and shown between the functionality of circuit elements and/or operations in an embodiment of the invention are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In the claims, any reference signs placed between parentheses shall not be construed as limiting the claim. Where the context admits, terms such as "first" and "second" are used to distinguish arbitrarily between the elements such terms describe and these terms are not necessarily intended to indicate temporal or other prioritization of such elements.

The invention claimed is:

1. A method of controlling an alternating current motor having a rotor and stator windings, the method comprising:
   determining an estimated initial angular position of said rotor; and
   producing a drive signal vector in stationary coordinates as a function of flux and torque components of a command signal vector in rotating coordinates using said estimated initial angular position, said determination of the estimated initial angular position of said rotor including:
      producing a high frequency reference signal vector as a d-axis component in rotating coordinates;
      transforming said d-axis component to produce a corresponding high frequency reference signal vector in stationary coordinates;
      applying, synchronously with the rotor, voltages corresponding to said high frequency reference signal vector in stationary coordinates to the stator windings of the motor;
      transforming corresponding high frequency stator current signal vectors in stationary coordinates to produce a corresponding q-axis stator current component in rotating coordinates;
      producing an estimated initial angular position of said rotor in dependence on said q-axis stator current component;
      adjusting said rotating coordinates using said estimated initial angular position and consequent adjustment of said voltages corresponding to said high frequency reference signal vector in stationary coordinates and of said q-axis stator current component; and
      producing an adjusted estimated initial angular position of said rotor as a function of said q-axis stator current component as adjusted,
   wherein determining the estimated initial angular position of said rotor and producing the adjusted estimated initial angular position of said rotor includes resolution of North-South polarity ambiguity in said position of said rotor and is performed with the rotor at standstill and before initially applying voltage corresponding to said drive signal vector to said stator windings, and wherein producing an initial value of said drive signal vector in stationary coordinates uses said adjusted estimated initial angular position.

2. A method of controlling an alternating current motor as claimed in claim 1, wherein producing an estimated initial angular position of said rotor as a function of said q-axis stator current component comprises mixing said q-axis stator current component with a signal in quadrature with said d-axis component.

3. A method of controlling an alternating current motor as claimed in claim 1, wherein adjusting said voltages corresponding to said high frequency reference signal vector in stationary coordinates and of said q-axis stator current component comprises adjusting said transformation of said d-axis component and of transforming said stator current signal vector in stationary coordinates.

4. A method of controlling an alternating current motor as claimed in claim 1, wherein producing said drive signal vector in stationary coordinates after initially applying voltage corresponding to said drive signal vector to said stator windings comprises a further step determining an estimated angular position of said rotor.

5. A method of controlling an alternating current motor as claimed in claim 4, wherein said further step of determining an estimated angular position of said rotor uses a signal from a physical rotor position sensor.

6. A method of controlling an alternating current motor as claimed in claim 1, wherein producing the adjusted estimated initial angular position of said rotor as a function of said q-axis stator current component as adjusted includes correcting an estimated initial angular position polarity.

7. A controller for controlling an alternating current motor having a rotor and stator windings, comprising:
   a module for determination of an estimated initial angular position of said rotor and for production of a drive signal vector in stationary coordinates as a function of flux and torque components of a command signal vector in rotating coordinates using said estimated initial angular position, said module including an element for production of a high frequency reference signal vector as a d-axis component in rotating coordinates, an element for transformation of said d-axis component to produce a corresponding high frequency reference signal vector in stationary coordinates, an element for application, synchronously with the rotor, of voltages corresponding to said high frequency reference signal vector in stationary coordinates to the stator windings of the motor, an element for transformation of a corresponding high frequency stator current signal vector in stationary coordinates to produce a corresponding q-axis stator current component in said rotating coordinates, an element for production of an estimated initial angular position of said rotor as a function of said q-axis stator current component, said elements being arranged to adjust said rotating coordinates using said estimated initial angular position and consequently adjust said voltages corresponding to said high frequency reference signal vector in stationary coordinates and said q-axis stator current component and to produce an adjusted estimated initial angular position of said rotor as a function of said q-axis stator current component as adjusted,
   wherein said elements are arranged to perform said determination of an estimated angular position of said rotor and production of an adjusted estimated angular position of said rotor with the rotor, including resolution of North-South polarity ambiguity in said position of said rotor, at standstill and before initially applying voltage corresponding to said drive signal vector to said stator windings, and wherein said module includes an element for production of an initial value of said drive signal vector in stationary coordinates using said adjusted estimated angular position.

8. A controller for controlling an alternating current motor as claimed in claim 7, wherein said element producing an estimated initial angular position of said rotor as a function of said q-axis stator current component comprises an element for mixing said q-axis stator current component with a signal in quadrature with said d-axis component.

9. A controller for controlling an alternating current motor as claimed in claim 7, wherein said element for transformation of said d-axis component and said element for transformation of said stator current signal vector in stationary coordinates are arranged to adjust said voltages corresponding to said high frequency reference signal vector in stationary coordinates and said q-axis stator current component.

10. A controller for controlling an alternating current motor as claimed in claim 7, wherein said module is arranged to produce said drive signal vector in stationary coordinates after initially applying voltage corresponding to said drive signal vector to said stator windings using a further element for determination of an estimated angular position of said rotor.

11. A controller for controlling an alternating current motor as claimed in claim 10, including a physical rotor position sensor, and wherein said further element for determination of an estimated angular position of said rotor is arranged to use a signal from a physical rotor position sensor.

12. A controller controlling an alternating current motor as claimed in claim 7, wherein said element for production of an adjusted estimated initial angular position of said rotor as a function of said q-axis stator current component as adjusted includes an element for correction of estimated initial angular position polarity.

13. Motor apparatus comprising an alternating current motor and a controller for controlling said alternating current motor as claimed in claim 7.

14. A method of controlling an alternating current motor as claimed in claim 2, wherein adjusting said voltages corresponding to said high frequency reference signal vector in stationary coordinates and of said q-axis stator current component comprises adjusting said transformation of said d-axis component and of transforming said stator current signal vector in stationary coordinates.

15. A method of controlling an alternating current motor as claimed in claim 2, wherein producing said drive signal vector in stationary coordinates after initially applying voltage corresponding to said drive signal vector to said stator windings comprises a further step of determining an estimated angular position of said rotor.

16. A method of controlling an alternating current motor as claimed in claim 2, wherein said producing the adjusted estimated initial angular position of said rotor as a function of said q-axis stator current component as adjusted includes correcting an estimated initial angular position polarity.

17. A controller for controlling an alternating current motor as claimed in claim 8, wherein said module is arranged to produce said drive signal vector in stationary coordinates after initially applying voltage corresponding to said drive signal vector to said stator windings using a further element for determination of an estimated angular position of said rotor.

18. A controller for controlling an alternating current motor as claimed in claim 9, wherein said module is arranged to produce said drive signal vector in stationary coordinates after initially applying voltage corresponding to said drive signal vector to said stator windings using a further element for determination of an estimated angular position of said rotor.

19. A controller for controlling an alternating current motor as claimed in claim 8, including a physical rotor position sensor, and wherein said further element for determination of an estimated angular position of said rotor is arranged to use a signal from a physical rotor position sensor.

20. A controller for controlling an alternating current motor having a rotor and stator windings, comprising:
   a module to determine an estimated initial angular position of the rotor, to produce a drive signal vector in stationary coordinates as a function of flux and torque components of a command signal vector in rotating coordinates using the estimated initial angular position, to produce a high frequency reference signal vector as a d-axis component in rotating coordinates, to transform the d-axis component to produce a corresponding high frequency reference signal vector in stationary coordinates, to apply, synchronously with the rotor, voltages corresponding to the high frequency reference signal vector in stationary coordinates to the stator windings of the motor, to transform a corresponding high frequency stator current signal vector in stationary coordinates to produce a corresponding q-axis stator current component in the rotating coordinates, to produce an estimated initial angular position of the rotor as a function of the q-axis stator current component, to adjust the rotating coordinates using the estimated initial angular position and consequently adjust the voltages corresponding to the high frequency reference signal vector in stationary coordinates and the q-axis stator current component and to produce an adjusted estimated initial angular position of the rotor as a function of the q-axis stator current component as adjusted,
   wherein the module is further configured to perform the determination of an estimated angular position of the rotor and production of an adjusted estimated angular position of the rotor with the rotor at standstill and before initially applying voltage corresponding to the drive signal vector to the stator windings, and wherein the module is further configured to produce an initial value of the drive signal vector in stationary coordinates using the adjusted estimated angular position.

* * * * *